United States Patent
Doris et al.

(10) Patent No.: US 7,707,470 B2
(45) Date of Patent: Apr. 27, 2010

(54) FAILURE SIMULATION BASED ON SYSTEM LEVEL BOUNDARY SCAN ARCHITECTURE

(75) Inventors: Hans-Rudolf Doris, Fuerth (DE); Thomas Lehner, Roth (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 385 days.

(21) Appl. No.: 11/553,159

(22) Filed: Oct. 26, 2006

(65) Prior Publication Data

US 2008/0104465 A1 May 1, 2008

(51) Int. Cl.
*G01R 31/28* (2006.01)
(52) U.S. Cl. .................. 714/727; 714/726; 714/729
(58) Field of Classification Search .............. 714/726, 714/727, 729
See application file for complete search history.

(56) References Cited

U.S. PATENT DOCUMENTS

| 5,627,842 | A | * | 5/1997 | Brown et al. ............. 714/727 |
| 5,841,788 | A | * | 11/1998 | Ke ............................. 714/726 |
| 7,359,643 | B2 | * | 4/2008 | Aronson et al. ............ 398/136 |

OTHER PUBLICATIONS

Bhavsar, An Architecture for Extending the IEEE Standard 1149.1 Test Access Port to System Backplanes, 1991, IEEE, Paper 28.2, pp. 768-776.*
Joshi et al., Evolution of IEEE 1149.1 Addressable Shadow Protocol Devices, 2003, IEEE, Paper 37.4, 981-987.*

* cited by examiner

*Primary Examiner*—John J Tabone, Jr.
(74) *Attorney, Agent, or Firm*—Wall & Tong, LLP

(57) ABSTRACT

A method and apparatus for reducing cost for the backplane and system test and for speeding up the time to market of a new product are disclosed. A failure simulation based on system level Boundary Scan architecture allows the use of an already available test infrastructure for test and validation.

16 Claims, 3 Drawing Sheets

100

220

FAILURE SIMULATION BASED ON SYSTEM LEVEL BOUNDARY SCAN ARCHITECTURE

FIELD OF INVENTION

The invention relates generally to the field of rack based system hierarchy and, more specifically, to failure simulation based on system level boundary scan (BSCAN) architecture.

BACKGROUND OF INVENTION

Each newly designed telecommunication circuit pack has to be tested in a system environment. The system test has to ensure that the behavior of the single circuit pack conforms to the requirements of the system. One kind of these tests is to check if failure, which happened on the circuit pack, will be identified by the application software and correlated into the expected consequent action. Therefore, as an example, SFPs (Small Formfactor Pluggables) have to be removed or disabled. In principle, this has to be done by hand, but from the cost- and time-to-market point of view, this kind of test has to be automated.

A common way of failure simulation in a system environment like optical module (SFP) removal or watchdog disabling is based on separate control lines from a debug or control circuit pack, which is part of the system only during system test. Via the control lines from the debug or control circuit pack, it is possible to stimulate circuit pack failures on each circuit pack at each slots of the system. When one or more of this kind of failure occurs, it will be checked during system test whether the failure has been detected by the system controller entity.

Using the common practice for failure simulation described above, it has the following disadvantages. First, additional control lines have to be designed in the system backplane. Second, the control lines will only be used for system test and are not customer relevant. Third, in order to use those control lines, additional control circuit packs (debug circuit packs) are necessary. Fourth, a test of a fully equipped shelf is not possible, because one slot is always used for the control circuit pack. Fifth, additional failure simulation forced by new circuit pack are often not possible, because new control lines can't be added to an existing backplane.

SUMMARY OF THE INVENTION

Various deficiencies of the prior art are addressed by the present invention of method and system for failure simulation based in system level boundary scan architecture.

In accordance with the present invention, an input output (I/O) circuit pack for fault simulation includes an interface circuit for facilitating communications between a backplane boundary scan (BSCAN) bus and a local BSCAN chain having a plurality of BSCAN devices including a fault simulation device, wherein the fault simulation uses existing test infrastructure for test and validation.

In accordance with another aspect of the present invention, a method for fault simulation using existing test infrastructure of a system environment, includes setting a fault simulation device to an active state, wherein the fault simulation uses existing testing infrastructure for test and validation; and setting all other devices on the local BSCAN chain to a bypass state.

In accordance with another aspect of the present invention, an apparatus having an interface means for facilitating communications between a backplane boundary scan (BSCAN) bus and a local chain means having a plurality of devices; and the local chain means simulates fault conditions using existing test infrastructure for test and validation.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention will be primarily described within the context of failure simulation based on system level boundary scan architecture. However, it will be appreciated that other techniques functioning in a relevant manner similar to that described herein with respect to failure simulation will also benefit from the present invention The IEEE standard 1149.5 describes a serial test and maintenance bus (MTM-Bus) that can be used to integrate modules into testable and maintainable systems/subsystems. This standard and IEEE standard 1149.1 may be used together within a system/subsystem to provide hierarchical test capabilities. In that case the MTM-Bus is designed as a hierarchical boundary scan bus, containing up to five lines (i.e., TMS, TCK, TDI, TDO and optional TRSTN) for a hierarchical boundary scan test.

In one embodiment of the present invention, the common bus architecture includes the backplane BSCAN bus, a master circuit pack (i.e., a central controller that contains the boundary scan master device) and several slave circuit packs, which have access to the bus using ASPs (Addressable Scan Ports). In another embodiment, an interface to an external host, instead of a boundary scan master circuit pack, is used. This external host is then equipped with a software controlled hardware interface, which is able to stimulate and to get the response from the system/subsystem according IEEE standard 1149.1.

Figure 1:
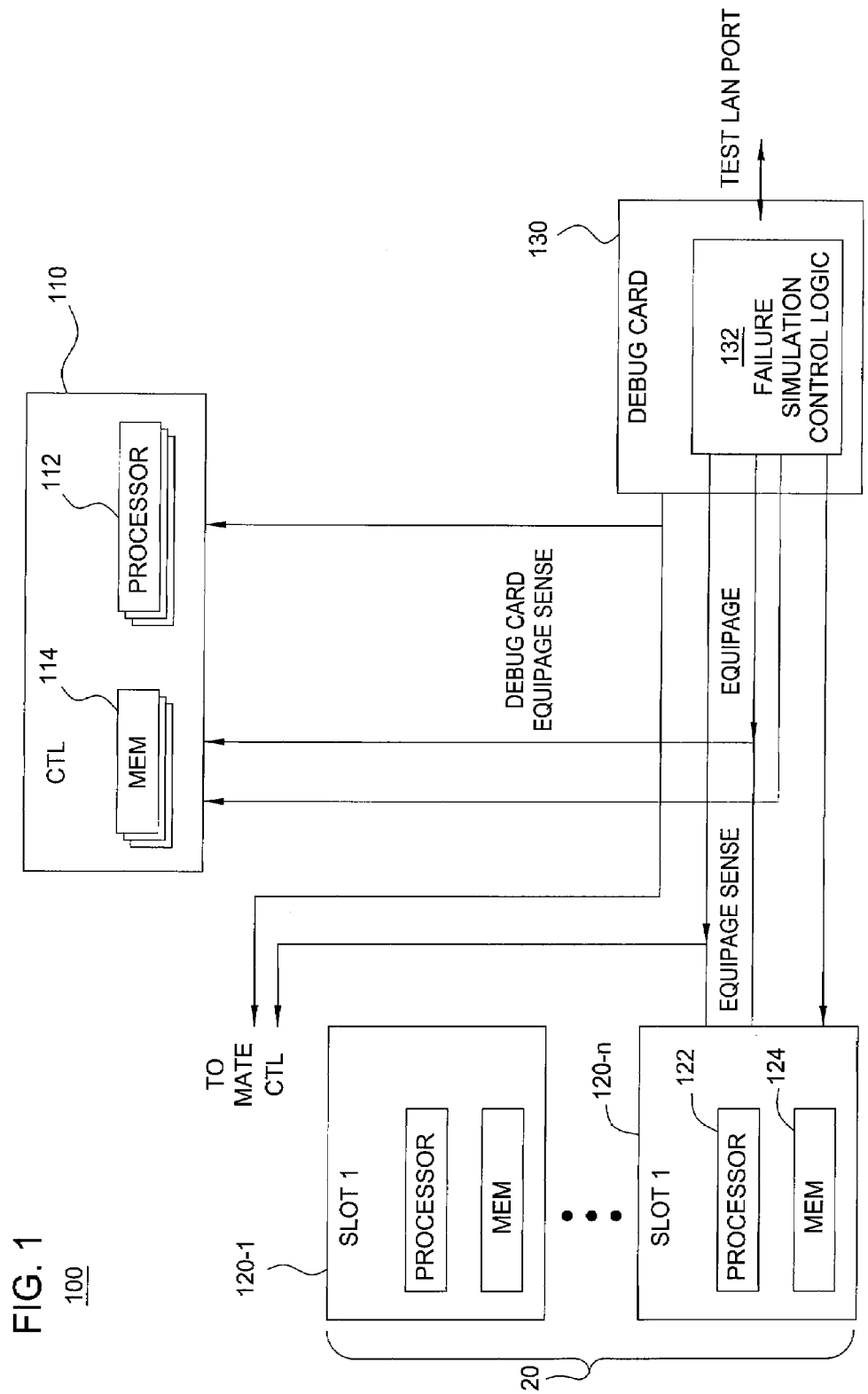
FIG. 1 depicts a high-level block diagram of a failure simulation in a system environment according to an embodiment of the present invention.

FIG. 1 depicts a high-level block diagram of a failure simulation in a system environment according to an embodiment of the present invention. The system 100 includes a controller (CTL) 110, slots 120-1 to 120-n collectively 120, and a debug card 130.

The controller 110 includes a processor 112 and a memory device 114. The controller 110 performs many functions in support of the telecommunications shelf such as simulating failure in order to test the telecommunications shelf. It also includes a plurality of input and output ports. In one embodiment, the input ports of the controller 110 receive the equipage signal from the debug card 130 indicating that the debug card 130 is connected. Moreover, the input ports receive the control signals from the debug card 130 on the failure simulation that is being currently performed. These signals allow the controller 110 to determine if it is providing the fault simulation signals or if it should let the debug card perform those functions.

The slot 120 provides the interface between the telecommunications shelf and external devices. The slot 120 includes a processor 122 and memory 124. In one embodiment, the telecommunications shelf provides n slots for interface. In another embodiment, the slot n 120-*n* is connected with the debug card 130. The slot 120-*n* receives the equipage signal in order for it to determine that a debug card is connected and it is set to provide failure simulation. The slot 120-*n* also receives the control signals that simulate the failures.

The debug card 130 is connected with slot 120-*n* and provides interface with a test LAN port. The debug card includes a failure simulation control logic 132 to produce the required signals to the communications shelf to simulate failures to the system. The logic 132 provides the equipage signal to the slot as well as the system controller. In another embodiment, the equipage signal is also sent to a mate controller (not shown). The logic also transmits the control signals to both the slot 120-*n* and system controller to simulate failure to the telecommunications shelf. In one embodiment, the failure simulation is selectively provided by the debug card 130 or the system.

Figure 2:
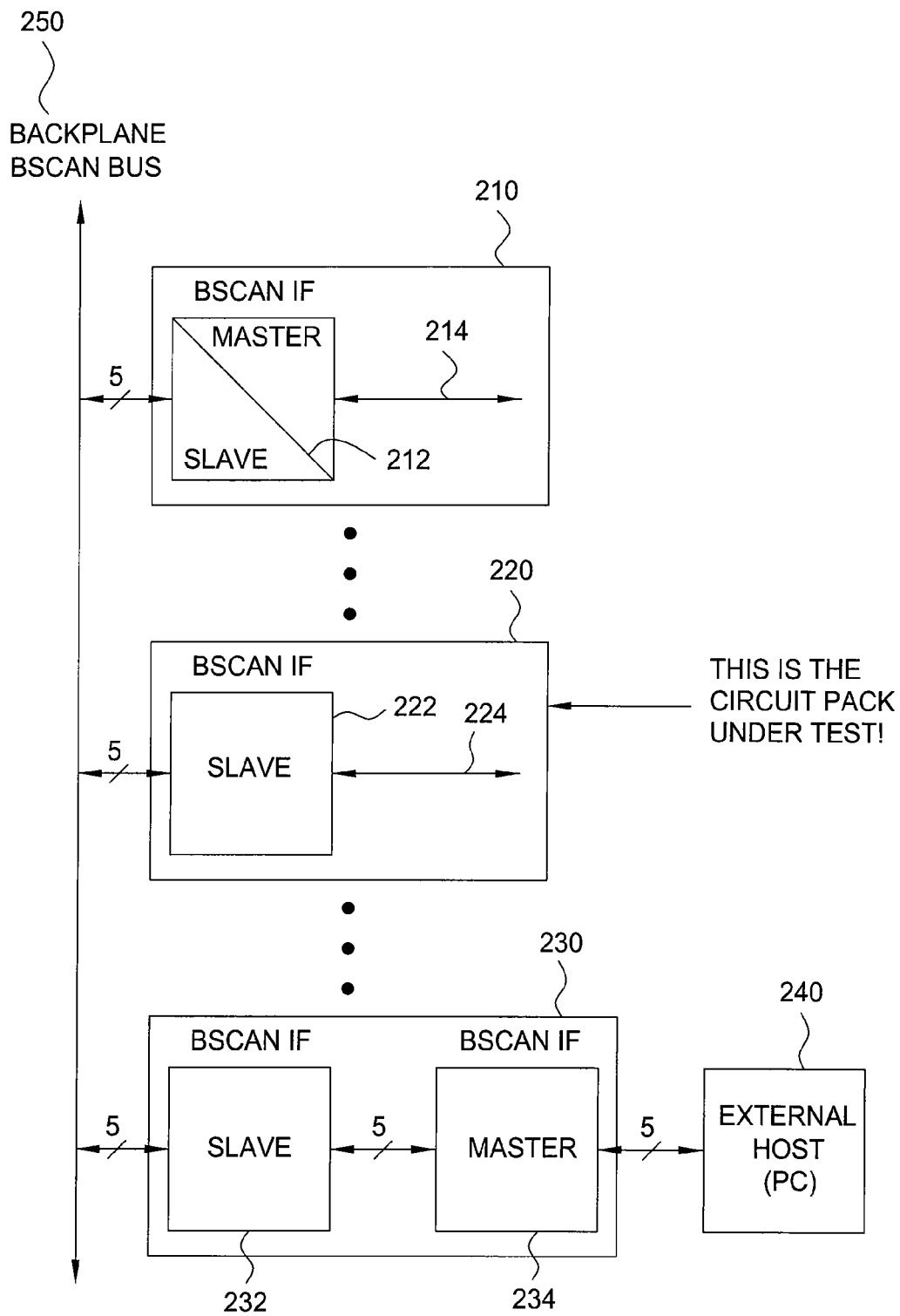
FIG. 2 depicts a high-level block diagram of an universal Master/Slave BSCAN architecture.

FIG. 2 depicts a high-level block diagram of a universal Master/Slave BSCAN architecture. The BSCAN architecture 200 includes a system controller 210, an input/output (I/O) circuit pack 220, a custom interface circuit pack 230 that interfaces with an external host 240 and a backplane BSCAN bus 250.

The system controller 210 connects to the backplane BSCAN bus 250 via a port on the bus 250. The controller 210 includes a BSCAN interface 212 that functions as either a master or a slave, which allows the system controller to either take control of the bus or let another port such as the I/O circuit pack or external host to take control of the bus 250. The system controller 210 also includes its local BSCAN chain 214, which includes at least one boundary device (not shown).

The system controller 210 during its functional mode acts as a node controller in the main shelf and as shelf controller in extension shelf. It can store the most recent alarm events. It can also store the most recent database change event. It also receives the health status from all circuit packs of the system.

The system controller 210 during BSCAN, in one embodiment, acts as a BSCAN slave to the system. In this state, the controller accesses via BSCAN interface like any other I/O circuit pack for BSCAN tests. In another embodiment, it acts as a BSCAN master in the system. In this state, the controller provides BSCAN pattern for BSCAN test or pattern for failure simulation to another I/O circuit pack.

The custom interface circuit pack 230 includes a slave BSCAN interface 232 and a master BSCAN interface 234. The slave BSCAN interface 232 is connected via a port on the backplane BSCAN bus such that the custom interface circuit pack 230 functions as a slave device on the backplane BSCAN bus. It also provides a master BSCAN interface 230 with the external host 240. The master BSCAN interface allows the external host 240 to communicate with the telecommunications shelf. In one embodiment, the external host is a personal computer (PC). In another embodiment, any device that provides the functions equivalent to the PC may be used. The PC includes special software which generates and provides the SCAN pattern to the system. In one embodiment, special hardware is necessary to provide the interface. For example, a PCI card may be used.

The I/O circuit pack 220 includes a local BSCAN chain 224 and an interface 222, which allows the I/O circuit pack to function as a slave component on the backplane BSCAN bus 250. The BSCAN chain includes a plurality of devices connected in series.

In one embodiment, the chain performs their typical functions. For example, the chain includes network processor, other interface devices (i.e., GPCN, LAN), mapper, memories, etc. In another embodiment, the chain sends and receives test pattern for the BSCAN test.

In one embodiment, the I/O circuit pack is the circuit pack under test. This circuit pack is discussed further below.

Figure 3:
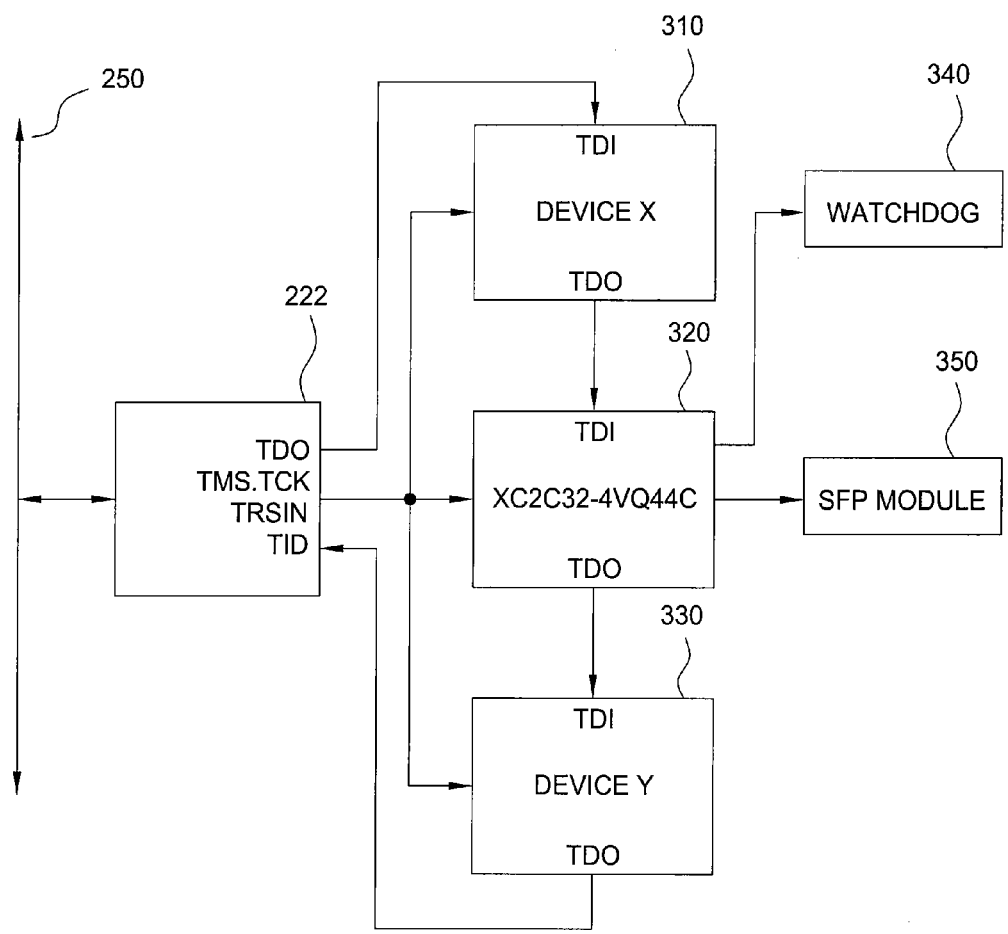
FIG. 3 depicts an I/O circuit pack with BSCAN device for fault simulation.

FIG. 3 depicts an I/O circuit pack with BSCAN device for fault simulation. For example, the I/O circuit pack 220 includes an interface circuit 222 and a boundary scan chain having a device X 310, a fault simulation device 320, and a device Y 330 connected in series. The interface circuit 222 is a slave device for communicating with the backplane bus. In one embodiment, the interface circuit 222 is an addressable scan port (ASP) LVT8996. In another embodiment, any ASP interface circuit may be used. Device X 310 and Device Y 330 can be any boundary scan devices. The fault simulation device 320 is for providing fault simulation to the communication system. The device 320 is connected to a plurality of failure simulation circuits. The failure simulation is always forced by device 320. One or more pins of device 320 are connected to a dedicated failure simulation circuit, such as a SFP, etc. In one embodiment, the simulation circuits include a watchdog 340 and a small form factor pluggable (SFP) module 350. The watchdog circuit simulates the failure where the voltage is outside the acceptable range for the system. Therefore, it receives a reset signal from the device 320 in order to start the test. A watchdog can be disabled to avoid a CPU recovery in case of software misbehavior. The SFP is an optical module. It tests an optical issue by providing optical simulation error. For example, if the SFP is turned off, it is simulating a broken fiber. In another embodiment, additional fault simulation circuits or different fault simulation circuits may be used. In a further embodiment, the simulation device 320 is a XC2C32-4VQ44C from XILINX, a company based in San Jose, Calif. This Xilinx device is chosen because it is inexpensive. This embodiment allows improvement to the simulation circuit pack with minimal cost increase. Every device of the BSCAN chain receives, in parallel, control signals from the interface 222. The control signals includes test mode select (TMS), test clock (TCK), test reset (TRSTN). The interface also has a port, test data output (TDO), that provides a test data signal. That signal is propagated to the test data input (TDI) port of device X 310. That signal is then transmitted from the TDO of device X 310 to the TDI of the fault simulation device 320. That signal is then transmitted from the TDO of the device 320 to the TDI of device Y 330 and finally from the TDO of device Y 330 to TDI of the interface circuit 222. Thus, the devices form a serial chain with respect to the test data signal.

Therefore, each circuit pack in the system with a local Boundary Scan bus is connected to the system wide Boundary Scan bus as described above. An additional Boundary Scan device only for failure simulation has been added to the local Boundary Scan chain of these circuit packs. This device does not contribute to the operational behavior of the circuit pack. During normal operation of the circuit pack in a system environment, this device can be controlled via the Boundary Scan master on the Central Controller and the Boundary Scan chain in the backplane. For simulating a failure, all other devices in the local Boundary Scan chain are in the IDCODE or BYPASS state (normal operation is further possible), but the fault simulation device 320 is in the EXTEST or active state. Each of the I/O pins of the device can be set to each level and stimulate the nets that the pins are connected to. For example, a SFP can be switched off (simulates e.g. a broken fiber) or a watchdog can be disabled to avoid a CPU recovery in case of software misbehavior.

Generally speaking, a fault simulation device according to the invention is included in the general circuitry of a circuit pack, device, system and the like. The fault simulation device cooperates with a test and validation system in an active state or mode of operation to accomplish the above-described test, measurement and validation operations. However, the fault simulation device also operates in a non-testing or inactive state or mode of operation (e.g., normal or installed operation of a circuit pack, device, system and the like) in which the fault simulation device does not operationally contribute to the operation of the circuit pack, device, system and the like. In this manner, a comprehensive suite of test and validation operations may be performed without changing existing test infrastructure and without compromising subsequent operation of the circuit packs, devices, systems and the like.

The new method reduces cost for the backplane and for system test and speeds up the time to market of a new product. The failure simulation based on system level Boundary Scan architecture allows the use of an already available test infrastructure. These simulated failures allow the system to test and validate consequent actions, caused by simulated failures, at system level in anticipated scenarios during system test at the lab and also during customer's usage of the system. The failure simulation based on system level Boundary Scan architecture has many advantages. For example, additional control lines in the system backplane are not needed. Also, no additional hardware (control circuit pack) is necessary. Therefore, a test of a fully equipped shelf is possible without adding additional components. Finally, additional failure simulation forced by new circuit pack is possible without redesigning the backplane.

Although various embodiments that incorporate the teachings of the present invention have been shown and described in detail herein, those skilled in the art can readily devise many other varied embodiments that still incorporate these teachings.

What is claimed is:

1. An input/output (I/O) circuit pack for fault simulation, comprising:
    an interface circuit for facilitating communications between a backplane boundary scan (BSCAN) bus and a local BSCAN chain; and
    the local BSCAN chain comprising a plurality of BSCAN devices including a fault simulation device connected in series are adapted to cooperate with a test and validation system in an active mode of operation and to avoid operational contributions in an inactive mode of operation wherein the I/O circuit pack further comprises a plurality of failure simulation circuits providing fault simulation to a communication system.

2. The I/O circuit pack of claim 1, wherein the plurality of failure simulation circuits comprises a watchdog circuit.

3. The I/O circuit pack of claim 1, wherein the plurality of failure simulation circuit comprises small form factor pluggable (SFP) circuit.

4. The I/O circuit pack of claim 1, wherein when the fault simulation device is simulating faults, the plurality of BSCAN devices on the I/O circuit pack in the local BSCAN chain are in a bypass state.

5. The I/O circuit pack of claim 1, wherein the interface circuit comprises control signals, wherein the control signals communicate in parallel with the plurality of local BSCAN devices including the fault simulation device.

6. A method for fault simulation using existing test infrastructure of a test and validation system, comprising:
    coupling an I/O circuit pack of failure simulation circuits providing fault simulation to the test and validaton system, the I/O circuit pack comprises an interface circuit for facilitating communications between a backplane boundary scan (BSCAN) bus and a local BSCAN chain, the local BSCAN chain comprising a plurality of BSCAN devices including a fault simulation device connected is series;
    setting the fault simulation device to an active state, wherein the fault simulation device is adapted to cooperate with the test and validation system in an active state and to avoid operational contributions in an inactive state of operation; and
    setting the plurality of BSCAN devices on the local BSCAN chain to a bypass state.

7. The method of claim 6, wherein the plurality of failure simulation circuit comprises a watchdog circuit that is disabled to avoid a CPU recovery in case of software misbehavior.

8. The method of claim 6, wherein the plurality of failure simulation circuit comprises a small form factor pluggable (SFP) that is switched off to simulate a broken fiber.

9. The method of claim 6, wherein the test signal is serially transmitted to the plurality of BSCAN devices of the local BSCAN chain.

10. The method of claim 6, wherein a control signal is transmitted to the fault simulation devices of the local BSCAN chain in parallel.

11. The method of claim 6, wherein the I/O circuit pack functions as a slave circuit pack.

12. An apparatus comprising:
    coupling means for facilitating communications between a plurality of failure simulation circuits providing fault simulation to a communication system;
    an interface means for facilitating communications between a backplane boundary scan (BSCAN) bus and a local BSCAN chain means comprising a plurality of BSCAN devices including a fault simulation means connected in series; and
    fault simulation means for cooperating with a test and validation system in an active mode of operation and to avoid operational contributions in an inactive mode of operation.

13. The apparatus of claim 12, wherein the plurality of failure simulation circuits further comprises watchdog means.

14. The apparatus of claim 12, wherein the plurality failure simulation circuits further comprises small form factor pluggable (SFP) means.

15. The apparatus of claim 12, wherein when the fault simulation means is simulating faults, the plurality of BSCAN devices in the local BSCAN chain means are in a bypass state.

16. The apparatus of claim 12, wherein the interface means provides control signals, wherein the control signals communicates in parallel with the plurality of BSCAN devices in the local BSCAN chain means.

* * * * *